C. E. BROWN.
Improvement in Traction-Wheels.

No. 130,892. Patented Aug. 27, 1872.

Witnesses.

Inventor,
C. E. Brown.
By his Attys.

UNITED STATES PATENT OFFICE.

CLARENCE EATON BROWN, OF FLORENCE, MASSACHUSETTS.

IMPROVEMENT IN TRACTION-WHEELS.

Specification forming part of Letters Patent No. 130,892, dated August 27, 1872.

*To all whom it may concern:*

Be it known that I, CLARENCE E. BROWN, of Florence, in the county of Hampshire and State of Massachusetts, have invented a new and Improved Traction - Wheel for Steam-Plows; and I do hereby declare the following to be a full, clear, and exact description of the same, reference being had to the accompanying drawing forming part of this specification, in which—

Figure 1:
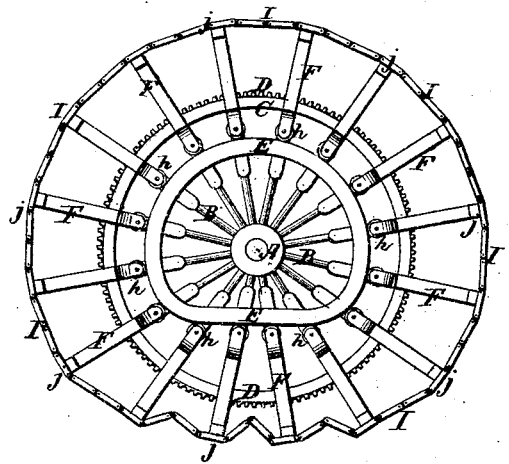
Figure 3:
Figure 2:
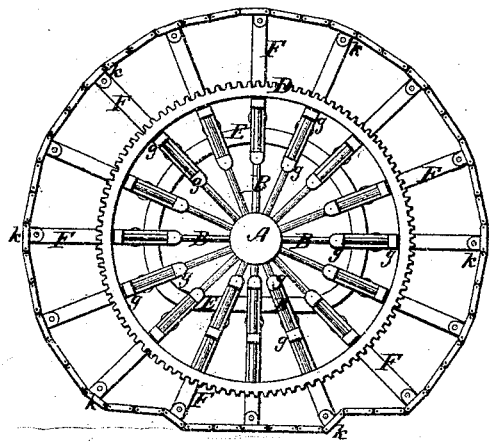
Figure 4:
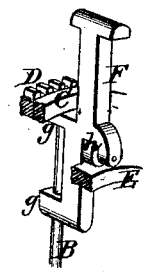

Figure 1 is an outside elevation of my improved traction-wheel; Fig. 2, an elevation of the opposite side; Fig. 3, a front elevation; and Fig. 4, a perspective view of one of the operating arms.

Similar letters of reference in the accompanying drawing indicate the same parts.

My invention has for its object to produce an improved traction-wheel for steam-engines, more particularly those employed for driving plows, which shall be simple and light in construction, and present a greater contact surface to the ground than those heretofore in use. To this end the invention consists, first, in constructing the wheel with a flexible rim, and combining therewith a series of sliding arms operated by a cam surrounding the hub, so that the rim shall be flattened as it comes in contact with the ground during the rotation of the wheel. It consists, secondly, in the construction of the sliding arms and their combination with the fixed spokes of the wheel, as I will now proceed to describe.

In the accompanying drawing, A is the wheel-hub, connected by spokes B to a concentric rim, C, whose inner face is provided with a toothed rim, D, which may be either cast in one piece with the rim C or made separate and secured thereto in any suitable manner. The latter construction I prefer, as it enables the wheel to be put together and taken apart more expeditiously. E is an eccentric or cam secured to the frame of the engine which carries the axle of the wheel. The cam occupies a position about midway between the wheel-hub and rim C D, its upper portion being concentric therewith, while its lower portion, beneath the wheel-hub, is nearly straight, as shown. F are the supplemental spokes or arms, mounted upon the spokes B by means of the lateral projection $g$, so as to slide freely thereon, and provided upon the side opposite the spokes B with friction-rollers $h$, bearing upon the periphery of the cam. The flexible rim of the wheel is composed of a series of pivoted plates or links, I, every third or fourth one of which is rigidly secured upon its under side to the outer end of a sliding arm, as shown at $j$, Fig. 1, or is pivoted thereto, as shown at $k$, Fig. 2.

The wheel thus constructed is driven from an engine upon the frame by any suitable arrangement of crank-shafts and pinions, the latter meshing into the toothed rim D, and its operation is as follows: As the wheel rotates the friction-rollers upon the sliding arms move around the periphery of the fixed cam, which keeps the upper portion or half of the flexible rim extended concentrically. When, however, they reach the short radius or under side of the cam the gravity of the wheel moves the sliding arms inward toward the hub, carrying the rim with them, and causing it to flatten out, as shown in the drawing, so as to present a greater acting surface upon the ground. On rough ground the traction-surface of the wheel assumes the form shown in Fig. 1, but upon roadways and smooth or level ground a number of plates are held in the same plane, as shown in Fig. 2.

It is necessary that the larger portion of the cam be concentric with the wheel-hub in order that the sliding arms shall move over it smoothly and with as little friction as possible. Instead of driving the wheel by the toothed rim, the latter may be dispensed with entirely and the axle of the wheel provided with a crank to receive the connecting-rod of the engine. In this case the wheel should be firmly keyed upon its axle, as will be readily understood. If desired, the rim C may be dispensed with when the toothed rim is not used; but I prefer to employ it as a means for connecting the spokes B. Spikes or pins may also be applied to the rim to prevent the latter from slipping upon the ground, although they are not generally necessary.

By my improvement traction-wheels are greatly simplified in construction and rendered exceedingly light and strong, while their tractive power is materially increased.

I do not of course confine the application of my invention to steam-plows, but design to use it upon road and other engines.

Having thus described my invention, what I claim is—

1. A traction-wheel constructed with a flexible rim adapted to be flattened in the line of its track by a fixed cam and a series of sliding arms, substantially as described, for the purpose specified.

2. In a traction-wheel, the combination of the fixed cam E, the sliding arms F, and the flexible rim, substantially as described, for the purpose specified.

3. The combination of the flexible rim, the sliding arms F, and the fixed cam E, with the short spokes B of the wheel, substantially as described, for the purpose specified.

4. The rims C D, in combination with the spokes B, cam E, sliding arms F, and flexible rim, substantially as described, for the purpose specified.

5. The sliding arms F, constructed with the lateral projections $g$ to fit upon the spokes B provided with the friction-rollers $h$ to bear upon the periphery of the cam, and either pivoted or rigidly connected at their outer ends to the plates of the flexible rim, substantially as described, for the purpose specified.

CLARENCE EATON BROWN.

Witnesses:
C. F. BROWN,
N. K. ELLSWORTH.